United States Patent [19]

Mohtasham

[11] Patent Number: 5,064,238

[45] Date of Patent: Nov. 12, 1991

[54] UMBRA, THE WINDSHIELD SUNSHADE ASSEMBLY

[76] Inventor: Mauni Mohtasham, 20 Rowes Wharf #402, Boston, Mass. 02110

[21] Appl. No.: 409,333

[22] Filed: Sep. 19, 1989

[51] Int. Cl.⁵ .................................................. B60J 3/02
[52] U.S. Cl. ................................. 296/97.6; 296/97.7; 296/97.8; 296/97.12
[58] Field of Search ................... 296/97.1, 97.5, 97.6, 296/97.8, 97.12, 97.7; 160/DIG. 3

[56] References Cited

U.S. PATENT DOCUMENTS

| | | | |
|---|---|---|---|
| 1,298,739 | 4/1919 | Langford | 296/97.8 |
| 2,594,813 | 4/1952 | Seibert | 296/97.8 |
| 2,747,927 | 5/1956 | Burkhead | 296/97.8 |
| 2,927,819 | 3/1960 | Johnson | 296/97.8 |
| 3,545,805 | 12/1970 | Wilson | 296/97.6 |
| 3,584,910 | 6/1971 | Lupul | 296/97.6 |

FOREIGN PATENT DOCUMENTS 189169  7/1986  European Pat. Off. ............ 296/97.8

Primary Examiner—Dennis H. Pedder
Attorney, Agent, or Firm—Malloy, Downey & Malloy

[57] ABSTRACT

The windshield sunshade assembly is designed to be mounted on the pivoted connector portion of the sun visor attachment of all motor vehicles so that a shade member is to be retracted or extended in order to cover the windshield from inside of vehicle to provide a sun-shielding effect. The windshield sunshade assembly according to this invention includes two support units; each support unit having a bracket anchored from one end to the uppermost perimeter edge of the windshield and the roof. Adhesive means are provided at the tip of the bracket to secure the support unit in position. The opposite end of the bracket includes a pair of pincers with two grasping jaws working on a pivot bounded together by means of a spring to grip firmly onto the connector portion of the sun visor attachment of the automobile. A cylindrical shade housing is designed to fit into complimentary holes on the support units and includes an internal sunshade roller normally biased in a rolled up position for storing the shade member thereon.

4 Claims, 7 Drawing Sheets

UMBRA, THE WINDSHIELD SUNSHADE ASSEMBLY

BRIEF SUMMARY OF THE INVENTION

In addition to the potential damage to the front dash board of any motor vehicle, direct sunlight rays can cause the interior of vehicle to become uncomfortably warm; therfore the object of the present invention is to provide a windshield sunshade assembly, designed to be mounted to ANY motor vehicle of substantial interior modification and complexity, to cover close to the tolerance of the windshield area, preventing most of the sunlight from entering through the windshield of the automobile. The present invention is to be mounted onto the pivoted connector portion of the sun visor attachment on the roof of vehicle and windshield, which enables a shade member to be retracted or extended, inorder to cover most of the windshield from inside to provide a sun shielding effect.

The windshield sunshade assembly according to this invention includes two support units, one cylindrical shde housing in TYPE A and two cylindrical shade housing in TYPE B and TYPE C, containing an internal sunshade roller which stores the shade material. Such shade member may be made from a highly reflective opaque sheet or similar heat and light insulating materials. The windshield sunshade assembly acording to this invention is quite easily mounted to any vehicle. This universal design with such ease of mounting and minimal installation labor requirement, would overcome the shortcoming of the existing units of similar function, since those retractable sunshades presently available suffer the disadvantage of a complex mounting provision, or not adequately covering the windshield.

The windshield sunshade assembly according to this invention is quite uncomplicated in design and may be integrated and installed into the roof of the vehicle, near the uppermost edge of the windshield, by the automobile manufactorer only by granting of this concession by the inventor.

Additional information is provided through a description of the windshield sunshade assembly according to this invention in conjunction with the accompanying drawings.

DETAILED DESCRIPTION OF THE INVENTION

As shown in FIG. 1-10, the sunshade assembly principally comprises: SUPPORT UNITS, SHADE HOUSING(S), SHADE MEMBERS.

The simplicity of how the sunshade assembly may be mounted to a vehicle is evident with reference to the drawings:

Fundamentally there are three types of the windshield sunshade assembly according to this invention and are as follows:

TYPE A: windshield sunshade assembly is designed to be mounted on vehicles with mirror attached on the windshield of vehicle; FIGS. 1, 2, 5, and 7.

TYPE B: windshield sunshade assembly is designed to be mounted on vehicles with mirror attached onto the roof of vehicle; FIGS. 3, 4, 6, and 8.

Figure 1:
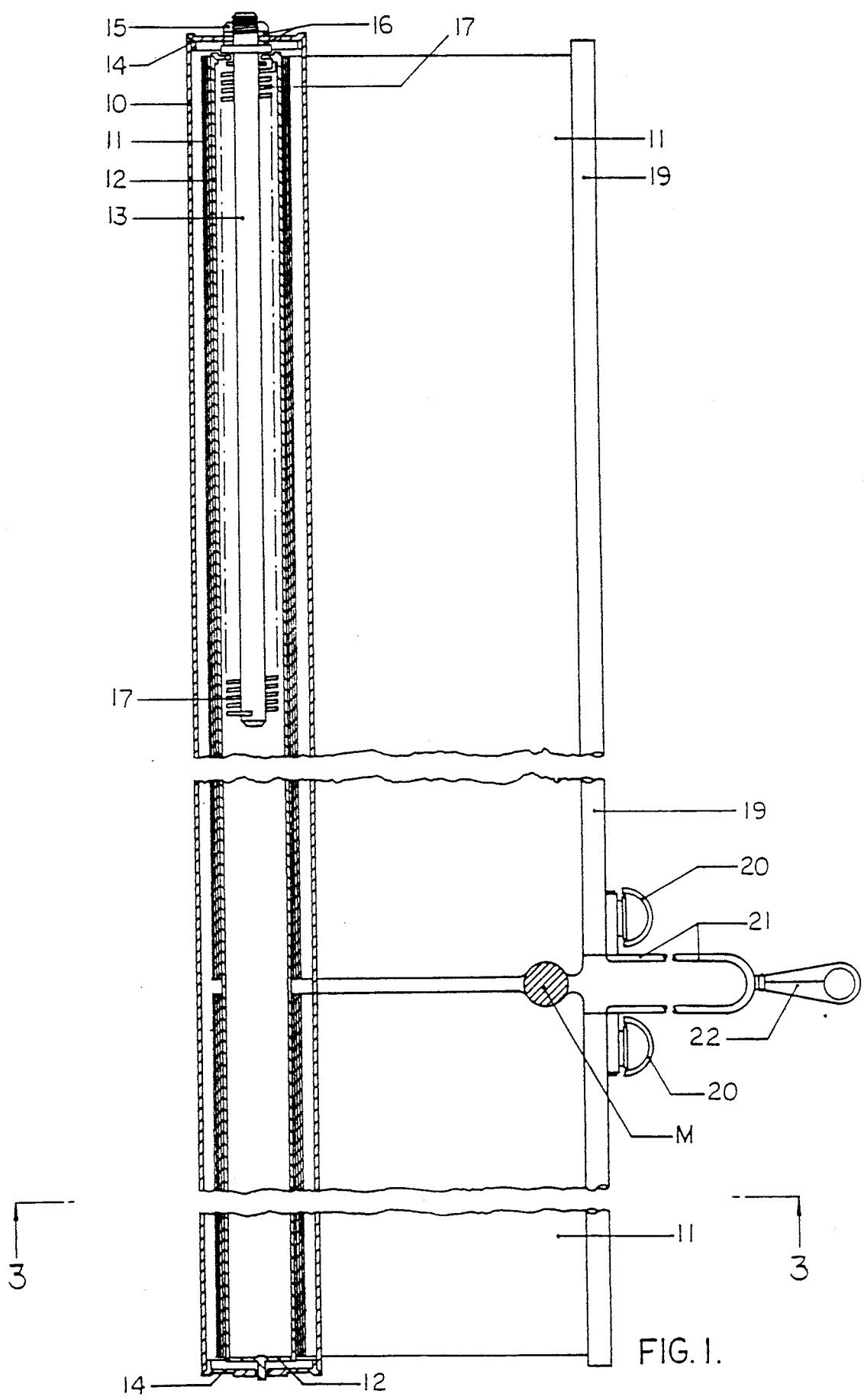
FIG. 1: is a longitudinal cross section view of the TYPE A windshield sunshade assembly.
Figure 2:
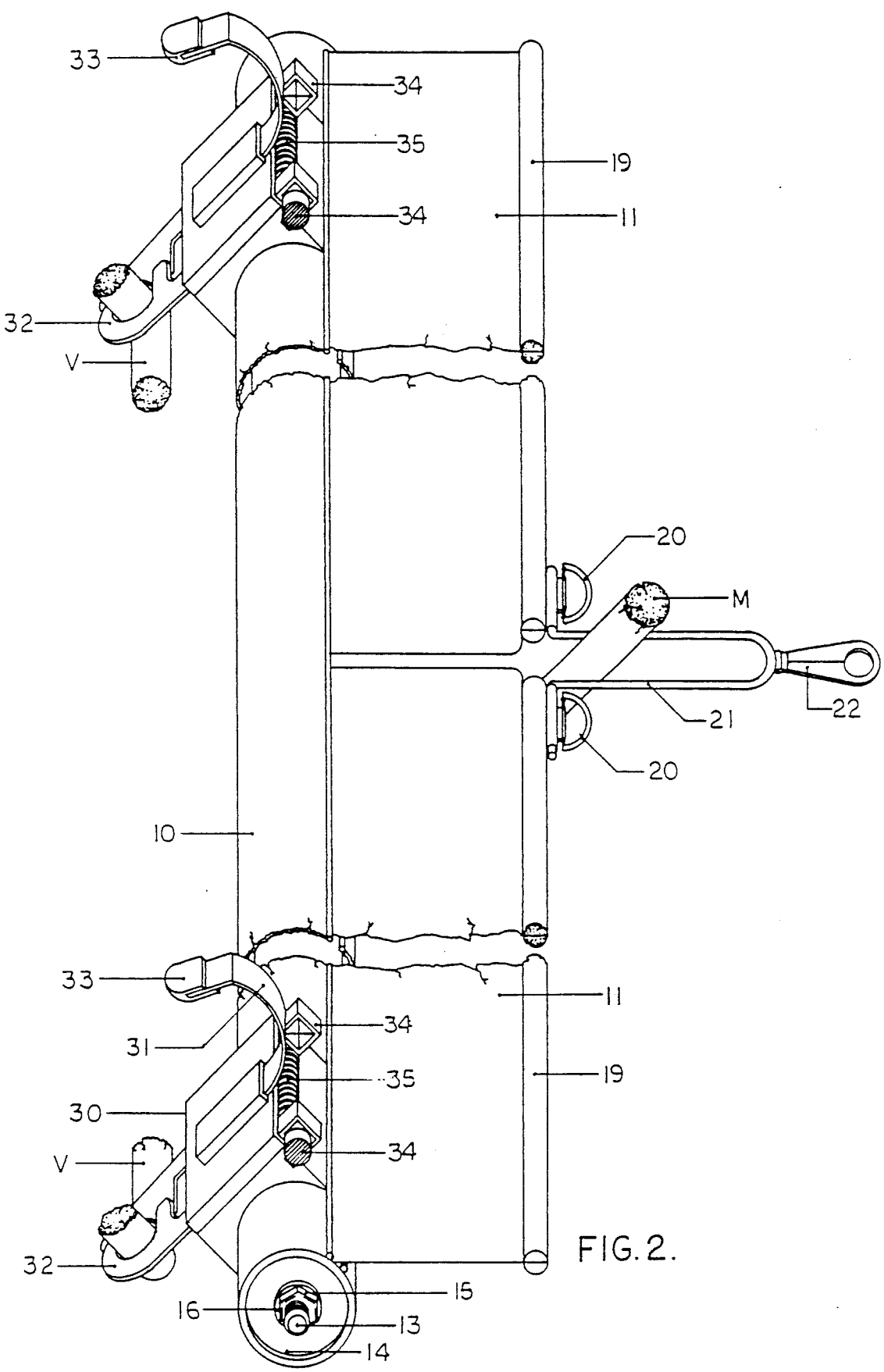
FIG. 2: is an axonometric projection view of the TYPE A windshield sunshade assebly.
Figure 3:
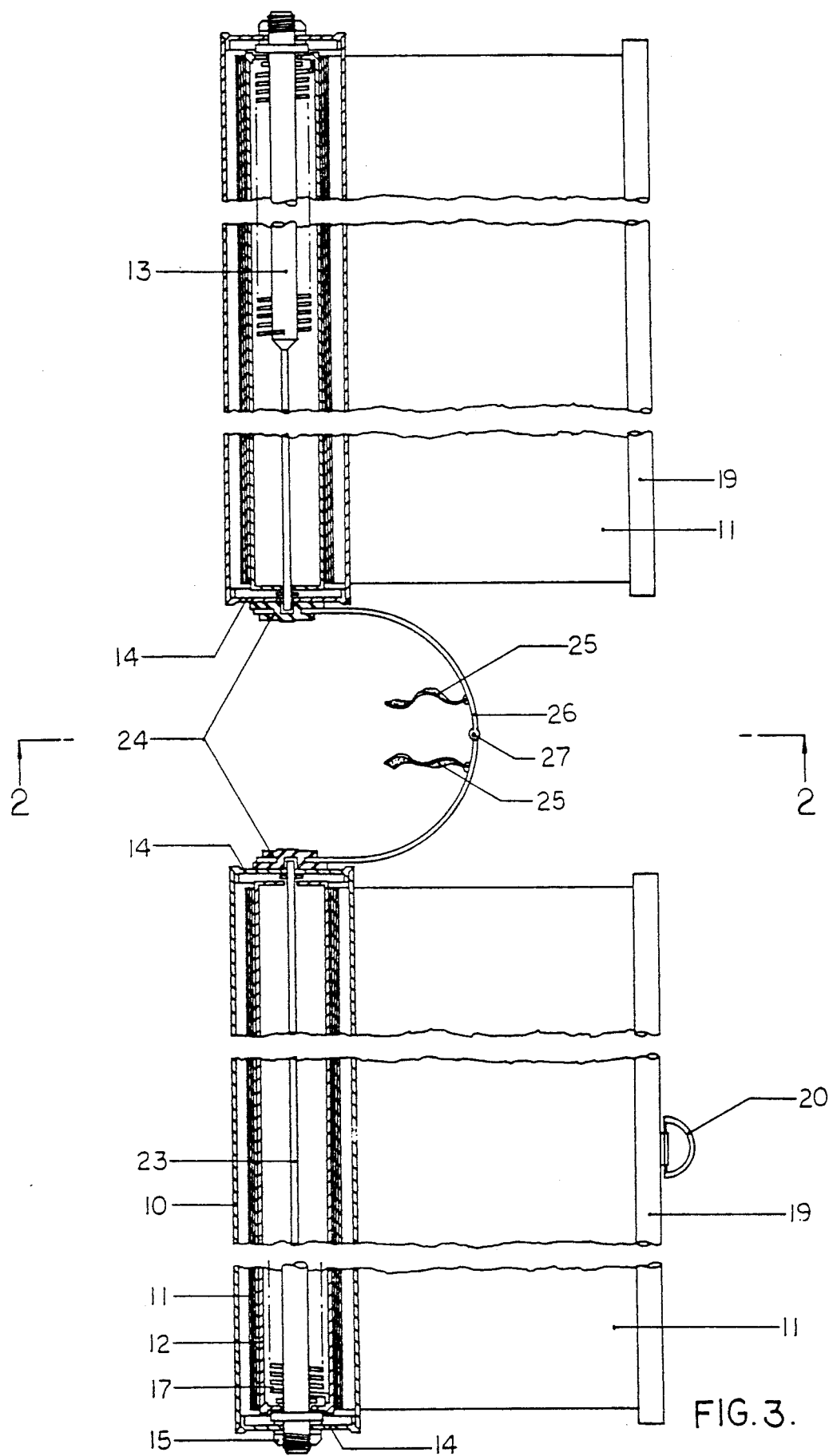
FIG. 3: is a longitudinal cross section view of the TYPE B windshield sunshade assembly.
Figure 4:
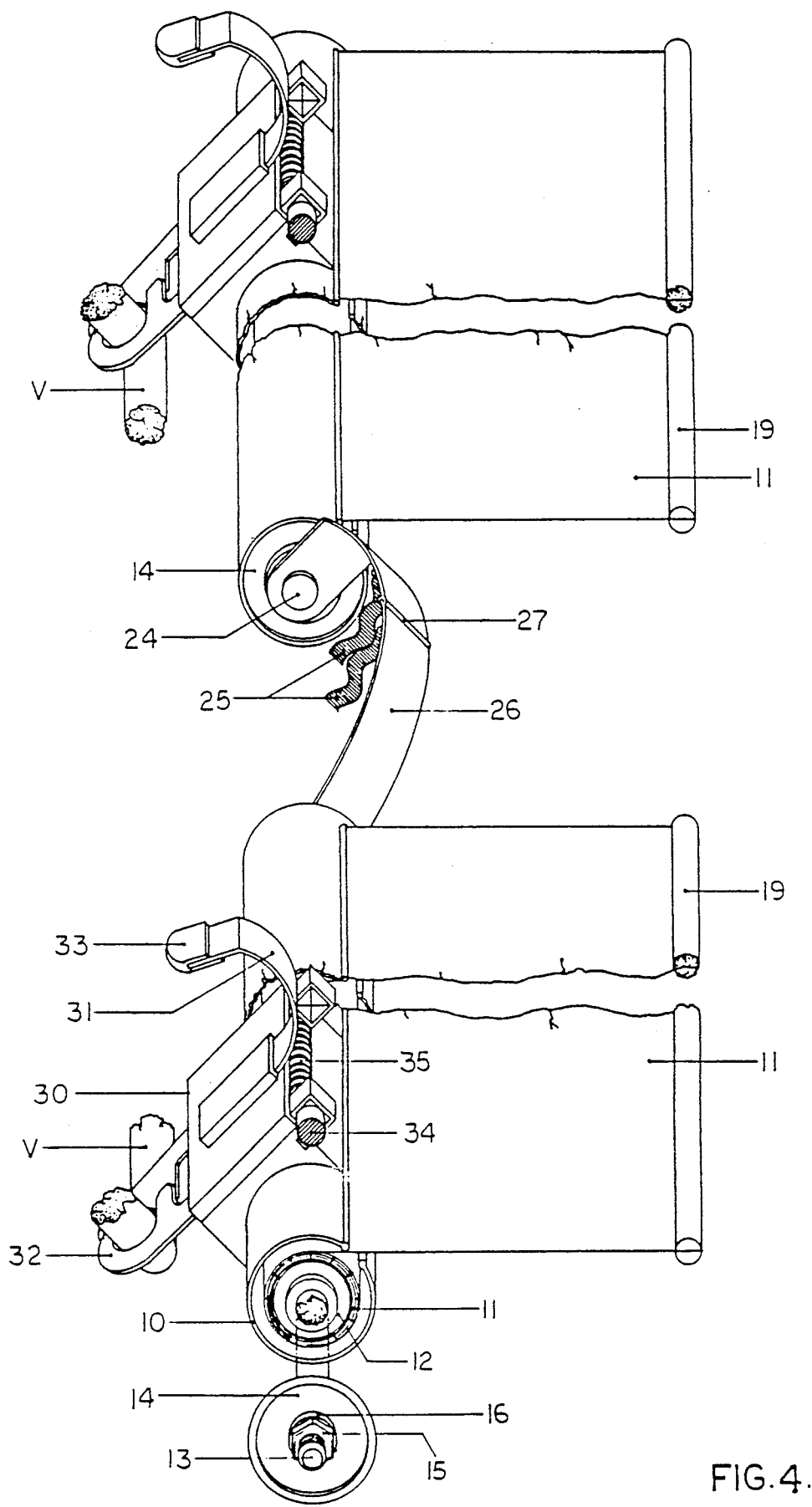
FIG. 4: is an axonometric projection view of the TYPE B windshield sunshade assembly.
Figure 5:
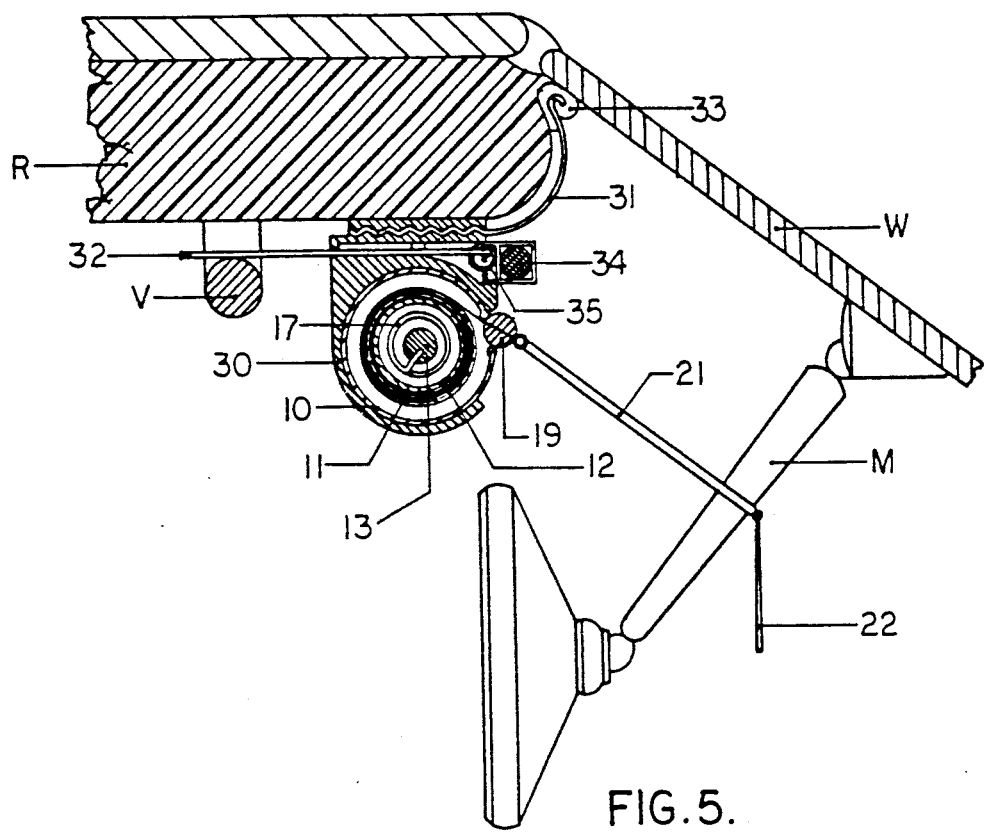
FIG. 5: is a latitudinal cross section view of the TYPE A windshield sunshade assembly mounted onto the roof of the automobile.
Figure 6:
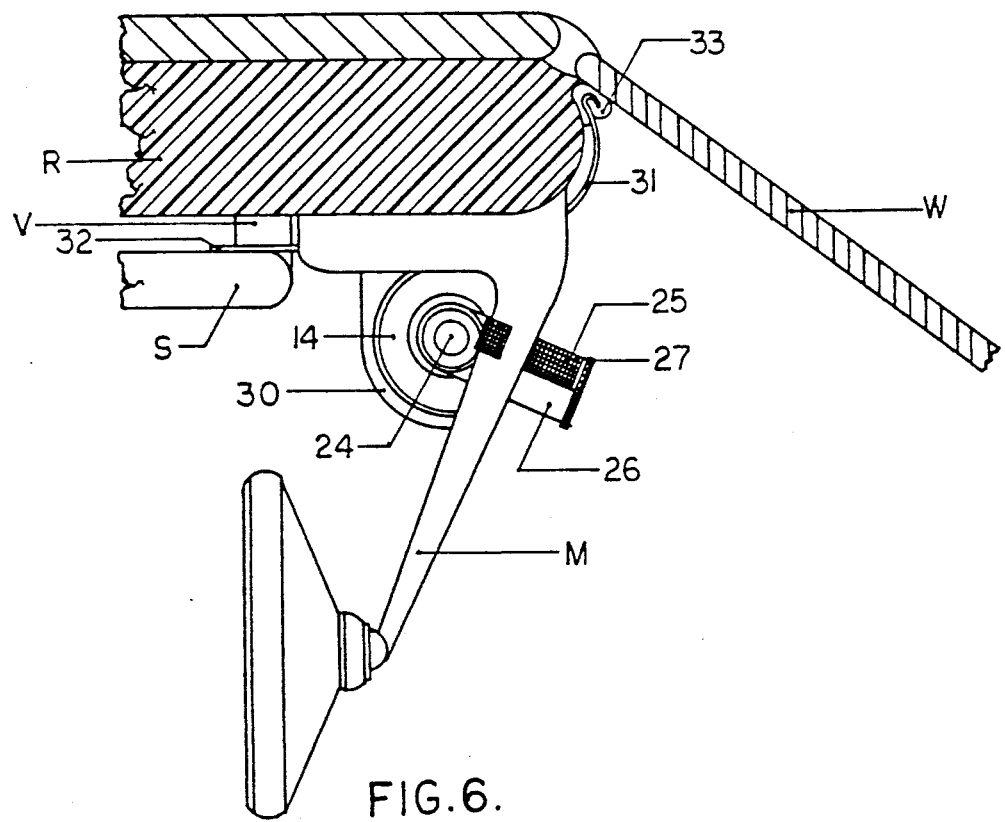
FIG. 6: is a latitudinal cross section view of the TYPE B windshield sunshade assembly mounted onto the roof of the automobile.
Figure 7:
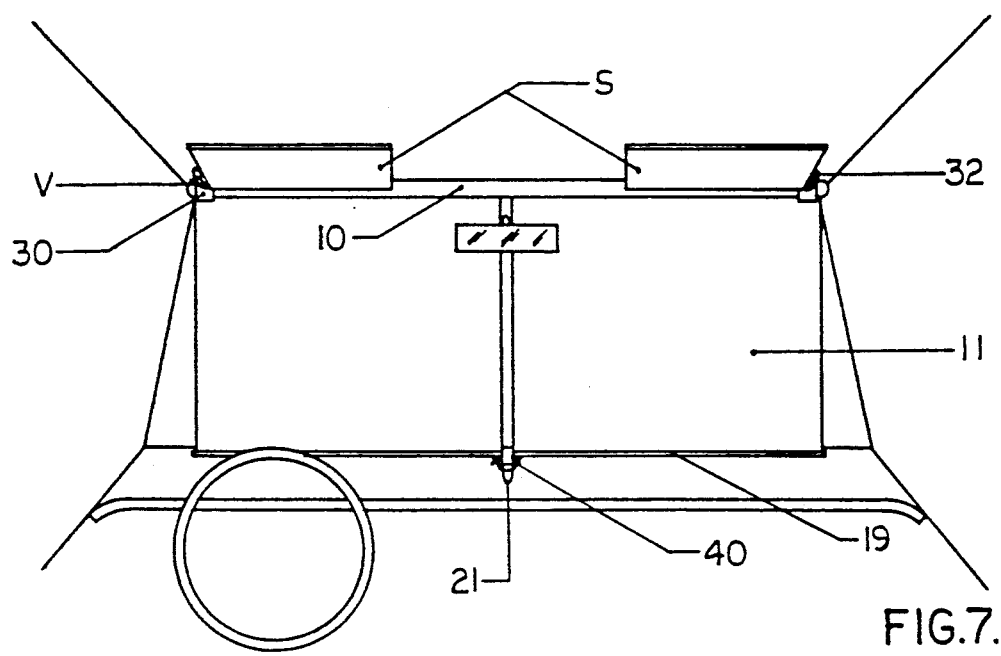
FIG. 7: is an interior perspective view of any automobile showing the mounting orientation for a TYPE A windshield sunshade assembly, with the extended shade member.
Figure 8:
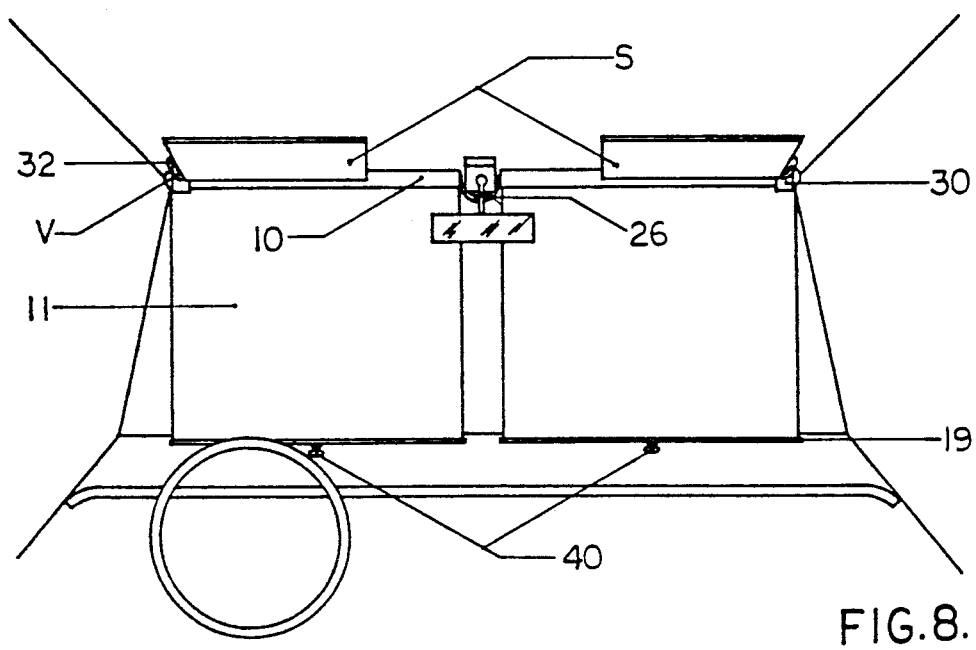
FIG. 8: is an interior perspective view of any automobile showing the mounting orientation for a TYPE B windshield sunshade assembly with the extended shade member.
Figure 9:
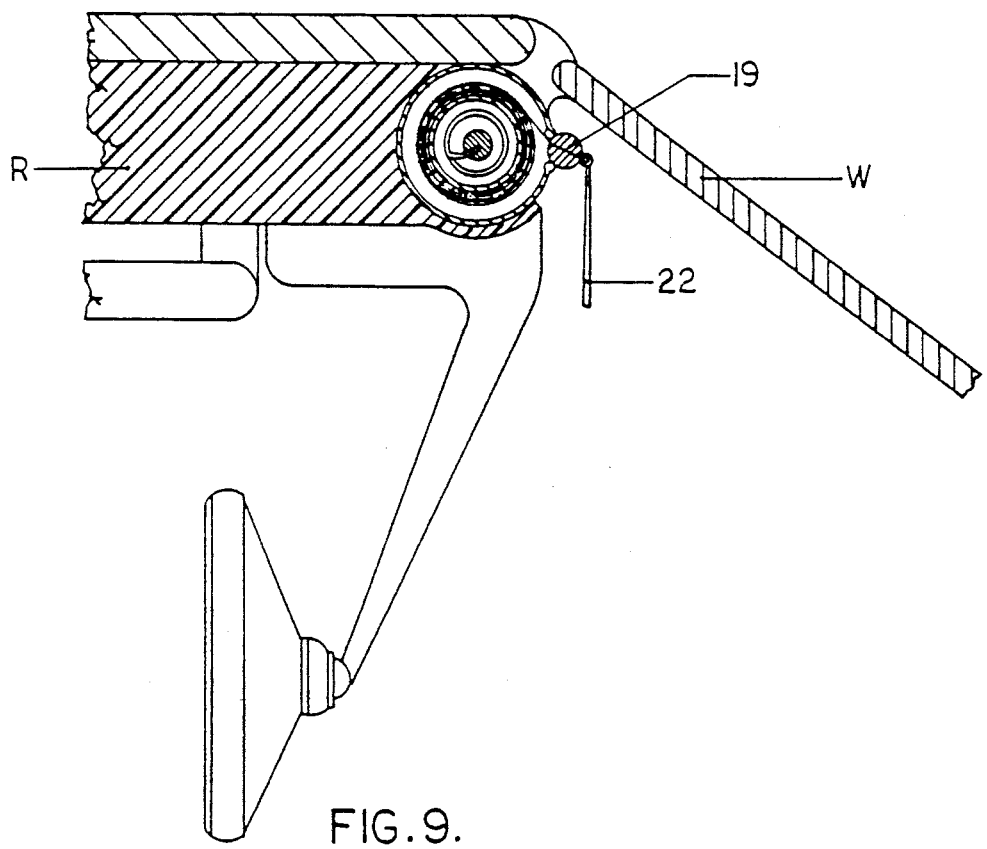
FIG. 9: is a latitudinal cross section view of the TYPE C windshield sunshade assembly according to this invention, incorporated into the roof of the automobile by the automobile manufactorer.
Figure 10:
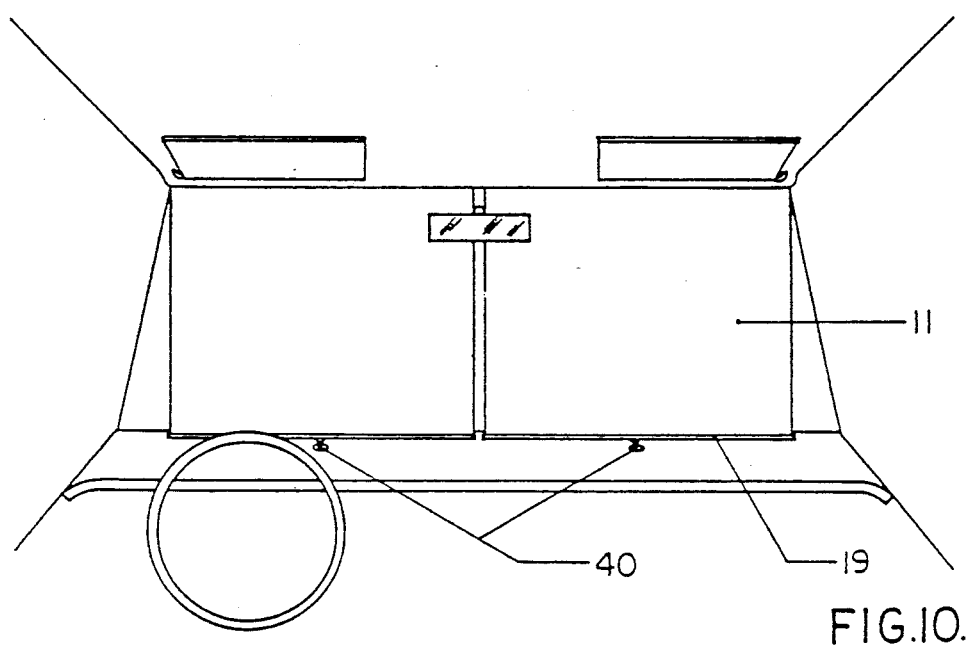
FIG. 10: is an interior perspective view of an automobile showing the TYPE C windshield sunshade assembly incorporated into the roof of the automobile by the automobile manufactorer with the extended shade member.

TYPE C: windshield sunshade assembly is an itegrated part of the vehicle's roof, installed by the manufactorer; FIGS. 9 and 10.

SUPPORT UNITS:

Each support unit 30 from one end includes a retaining slot 36 on its upper surface for holding a bracket 31 in the form of a hook, is adapted for gripping or anchoring onto the uppermost perimeter edge of the windshield W and the roof R of the vehicle. Adhesive means 33 are provided at the tip of the bracket 31 to secure the support unit 30 in position. The opposite end to that of the bracket 31, however, having a claw 32 resembling a pair of pincers with two grasping jaws working on a pivot, bounded together by means of a spring 35 to grip firmly onto the connector portion V of the sunvisor attachment of the automobile. Once the bracket portion 31 with adhesive tape 33 is anchored to the edge of the roof R and the windshield W, the support unit 30 is pulled back so that the claw portion 32 at the opposite end is engaged with connector portion V of the sunvisor attachment to sustain a firm position. When both support units 30 are securely in position, then both opposite ends of the shade housing 10 may fit into the complementary shaped hole on the support units 30.

SHADE HOUSING:

Shade housing 10 is an elongated cylindrical shaped housing, retaining shade roller 12.

SHADEROLLER:

Shade roller 12 is a hollow elongated cylindrical member mounted from one end for rotation on roller shaft 13 and the opposite end having a cylindrical pin end which fits into a complementary shaped hole in end surface 14 for rotation.

ROLLER SHAFT:

Roller shaft 13 is a solid elongated cylindrical shaped component which is attached to shade housing 10 such that it does not rotate relative to the housing 10. Roller shaft 13 is axially restrained by nut 15 and two washers 16 on threaded shaft end.

TORSION SPRING:

Torsion spring 17 has one end affixed to the free end of the roller shaft 13 and opposite end coupled to shade roller 12 such that the rotation of the roller 12 develops a torsional force on the roller 12 which in turn exerts a retraction force on shade member 11.

SHADE MEMBER:

Shade member 11 may be made of heat and light insulating materials. One edge of the shade member is affixed to shade roller 12. Shade member 11 passes through an elongated opening defined by shade housing 10. The opposite edge of the shade member 11 is reinforced and stiffened by support rod 19. Once the support rod 19 is pulled, the torsion spring 17 is preloaded in a manner such that support rod 19 is urged toward adjoining with shade housing 10. For this application only a single hand of the operator can easily pull downwardly on the shade puller 22 affixed on center of the support rod 19 to quickly and conveniently extend shade member 11 to a full position, in order to engage ring 20 with affixed hook 40 on the dash board of vehicle to sustain shade member 11 in position. This action causes shade member 11 to be unrolled from roller 12 and withdrawn from housing 10. (a gripping cupule may replace hook 40 and ring 20)

TYPE A WINDSHIELD SUNSHADE ASSEMBLY:

The sunshade assembly includes one cylindrical housing 10 with members between the two support units 30. This unit is to be mounted onto the vehicles in which the mirror is attached to the windshield of vehicle.

Once the shade housing 10 is mounted onto the support units 30 shade puller 22 is grasped by the user and pulled downward so that the shade member 11 is in an extended position and the mirror M on the windshield may pass through the center slit 18 on the shade member 11 in order to engage the U-shaped element 21 with the stem of the mirror (FIGS. 1, 2, 5 & 7). The appropriate length of the U-shaped element 21 would allow all shade member 11 to be stored on shade roller 12. No more additional mounting provisions are required. When it is desired to extend shade member 11, shade puller 22 is grasped by the operator and pulled to an extended position to engage ring 20 with the hook 40 attached on the dash-board. (center-slit on shade member 11 allow full extention of shade member 11 on either side of the mirror.)

TYPE B WINDSHIELD SUNSHADE ASSEMBLY:

The sunshade assembly includes two cylindrical housing 10 with members plus the housing connector 26 between the two support units 30. The two housings 10 are supported at far ends by two support units 30 and near ends are pivoted 24 to a semi-circular, U-shaped device 26 capable of rotating 360 degree along its central axis, which is also pivoted in the middle 27 to allow bending motion for adjustment. The self adhesive elastics 25 on the housing connector 26 may wrap and seal around the stem of the mirror M to hold the unit firmly in the desired position. Two engagable hooks 40 are also attached by any conventional means on the dash-board of the vehicle directly in line with rings 20. Once ring 20 engages with hook 40, the shade member 11 is secured in place. Two cupules may replace ring 20 and hook 40 to grip on to the windshield. No additional mounting provisions are required. Due to this simplified mounting capability the windshield sunshade assembly according to this invention may conveniently be mounted to any motor vehicle of various design and configuration.

TYPE C WINDSHIELD SUNSHADE ASSEMBLY:

Type C according to this invention is quite uncomplicated in design and may be integrated and installed into the roof of the vehicle close to the edge of the windshield, by the automobile manufactorer (FIG. 9 & 10). The sunshade assembly may include one cylindrical housing 10 with units or two cylindrical housing 10 with units.

What is claimed is:

1. For mounting to a roof and windshield of a motor vehicle, a windshield sunshade assembly comprising:
    a plurality of support units adapted to be mounted to the roof and windshield,
    each one of said plurality of support units including a bracket having an adhesive means on its tip for adhering said bracket to an upper edge of the windshield,
    a pair of pincers connected to and extending from each of said support units opposite said bracket,
    said pair of pincers including opposing jaw members being normally biased in a closed, gripping position for secure attachment to a sunvisor attachment stem extending from said roof so as to secure the support unit thereto,
    a cylindrical elongate shade housing adapted to be connected to and supported by said plurality of support units so as to extend at least partially along the length of said roof in parallel spaced relation thereto,
    a roller shaft extending axially through an interior portion of said shade housing,
    a shade roller rotatably mounted about said roller shaft within said interior portion of said shade housing, and including retracting means to bias said shade roller to a normally wound position, and
    a retractable shade member connected along an upper edge to said shade roller and adapted to be moved between a retracted, rolled up position on said shade roller and a fully extended position in covering, light blocking relation to an inner surface of the windshield.

2. The windshield sunshade assembly according to claim 1 further comprising a support rod affixed to a lower edge of said shade member.

3. The windshield sunshade assembly according to claim 2 further comprising a semi-circular flexible connector extending between and connecting two said shade housings for mounting a plurality of shade members to the roof and windshield.

4. The windshield sunshade assembly according to claim 1 further comprising a multiple shade puller means including a U-shaped member having two upper free ends each connected to the support rod of two adjacently mounted said shade members, said multiple shade puller means further comprising a pull tab connected to and extending from a lower portion of said U-shaped member, wherein a downward pulling force on the pull tab acts to lower said adjacently mounted shade members simultaneously.

* * * * *